Oct. 4, 1966 C. E. RHODES 3,276,334
JOINT FILLER STRIP AND METHOD OF MAKING SEALED JOINT
Filed April 5, 1961
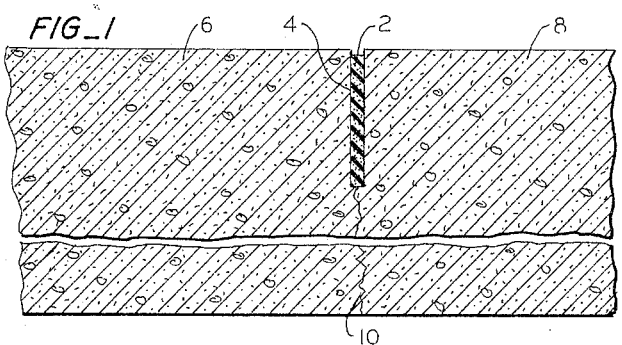
FIG_1
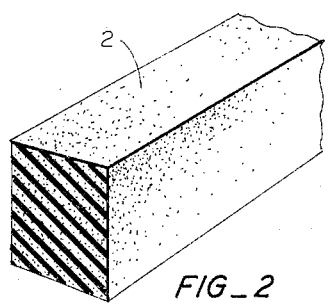
FIG_2
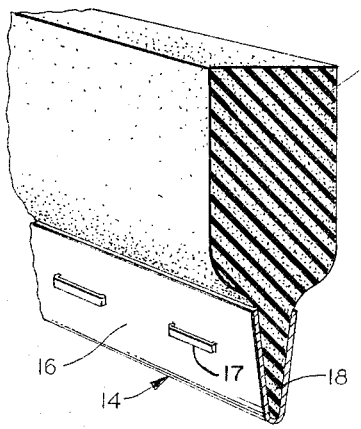
FIG_3
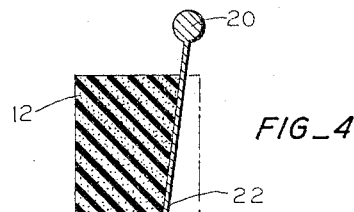
FIG_4
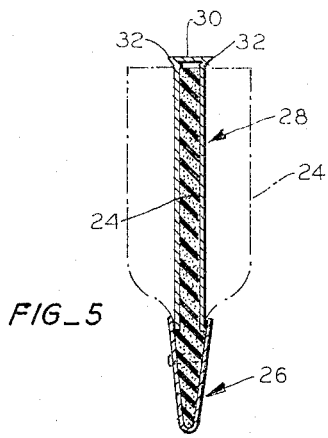
FIG_5
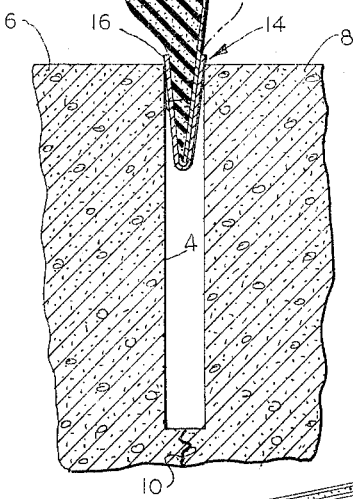
FIG_6
INVENTOR.
CECIL E. RHODES
BY
Paul M. Klein Jr.
ATTORNEY

United States Patent Office 3,276,334
Patented Oct. 4, 1966

3,276,334
JOINT FILLER STRIP AND METHOD OF
MAKING SEALED JOINT
Cecil E. Rhodes, 1450 Lincoln Ave., Burlingame, Calif.
Filed Apr. 5, 1961, Ser. No. 101,031
5 Claims. (Cl. 94—18)

The invention described herein may be manufactured and used by or for the Government of the United States of America for governmental purposes without the payment of any royalties thereon or therefor.

This invention relates to joint sealers, methods of sealing joints, sealed joints, and methods of making sealed joints.

This invention is useful in connection generally with joints having joint spaces but its virtues are readily discernible from a consideration of its use in reference to joints in concrete pavements. Therefore, for illustration only, the relationships of this invention to the prior art will be discussed, for simplicity, with reference to one type of such concrete pavement joint commonly known in the art as a contraction joint.

Prior art sealers for such joints, methods of sealing such joints, and methods of making sealed joints suffer from various difficulties. Typically, a contraction joint, as described, for example, in "Design of Concrete Airport Pavement," copyright 1955, by Portland Cement Association, published by Portland Cement Association, Chicago 10, Illinois, is produced by sawing, with a diamond saw, a groove or slit across a section of concrete as soon as it has hardened sufficiently, perhaps about 8 hours after pouring, to permit of getting on it. After the concrete "sawdust" has been flushed out with water and the joint groove has dried, common practice has been to fill the joint with a liquid joint sealer commonly made of asphalt, asphalt-rubber compounds, or the like. In the interest of economy in sawing and of providing a smooth pavement surface it is desirable to keep the saw cuts to a minimum width. However, when the cut is as narrow as of the order of ⅛ inch in width it is difficult to fill it with liquid joint filler without having some of the filler run out over the top of the slit. When concrete contracts during setting, its volume always being the greatest when it is poured, the ordinary poured filler cannot expand to keep the expanded space filled and depends upon adhesion to the walls of the joint to stretch the joint sealer to prevent incompressible material like pebbles or metal bits falling into the groove, or water seeping in which may later freeze. The expansion of the concrete under a temperature rise can cause damage to the pavement because of the presence of incompressible bodies in the groove. Similarly, expansion of ice in the groove can cause fracture of the pavement. Attempts to bond a joint filler strip to the sides of the joint space have not been very successful since repeated contraction and expansion of the joint breaks the bond, again permitting the formation of a space into which undesired water or incompressible bodies may fall.

Efforts at the use of preformed, precompressed expansion joint filler strips, illustrated by U.S. Patent No. 2,401,936, have suffered from certain handicaps in that filler strips of this type require the use of an outside agent such as moisture to cause them to expand in the joint and remain expanded. Thus they would not be satisfactory in arid areas. Furthermore, the material of which they are made is necessarily so bulky, when made of practical size, as to preclude the use of the desirable very narrow contraction joint grooves.

An object of the present invention therefore is to provide a joint sealer which is useable in relatively narrow joint spaces and which will continuously fill the joint and is not accidentally removable therefrom by contact with shoes, vehicles, power driven street cleaning brushes, jet engine gas flow and the like.

Another object of the invention is to provide a joint sealer which is preformed and precompressed and which will, when placed in a joint, expand and continuously fill the joint space from its own resilience and without the use of externally applied agents.

Other objects and many of the attendant advantages of this invention will be readily appreciated as the same becomes better understood by reference to the following detailed description when considered in connection with the accompanying drawings wherein:

FIG. 1 is a cross section of a concrete pavement showing a sawed groove at a contraction joint with a filler strip of the present invention in the groove;

FIG. 2 is an axonometric view of the joint filler strip of FIG. 1 expanded to its unconfined dimensions and drawn to the same scale as FIG. 1.

FIG. 3 is a view of a modification of the joint filler strip of FIG. 2 having a leader strip attached thereto;

FIG. 4 is a cross sectional view of a concrete contraction joint similar to that of FIG. 1, illustrating the process of installing the joint filler strip of FIG. 3;

FIG. 5 is a cross sectional view of another modification of the joint filler strip of the present invention including a removable cover and a leader strip; and FIG. 6 is a view of the joint filler strip of FIG. 2 as supplied for storage and use in precompressed form.

As previously indicated the present invention is applicable to a variety of joints having joint spaces requiring sealing. For example, the invention is applicable to joints in buildings around window frames, door frames and the like, and in joints in the forms for casting concrete, as well as in other joints requiring sealing or caulking. The invention has particular utility in concrete pavement joints including what are known in the art as contraction joints, construction joints, and expansion joints. For simplicity, the invention will be described in reference to contraction joints in concrete pavements although it will be obvious that the principles of the invention are applicable to other types of joints.

The invention comprehends a material comprised of cellular elastomer impregnated with pressure-sensitive adhesive which material is provided according to the invention with certain characteristics yielding properties which enable the material to accomplish desired functions immediately hereinbefore recited. In order to stay in place in a joint space or groove without the use of a separate cement or bonding agent the material is chosen to be one which can be precompressed to a thickness less than width of the joint space and when then placed in the joint space or groove will expand so as to exert on the walls of the groove sufficient pressure, typically preferably at least 1½ p.s.i., to produce a friction force adequate to successfully resist attempted extraction from the joint by such forces as the blast pressure and/or the vacuum caused by jet engines and the action of a street cleaning brush. In order to be easily insertable in, for example, a groove as narrow as ⅛ inch, the material is chosen to be one which can be compressed by pressures conveniently available in the field, preferably not to exceed about 100 p.s.i., to a thickness sufficiently less than the width of the groove to allow it to be readily put or dropped into the groove without struggle, say a thickness of about ¹⁄₁₆ inch in the case of a ⅛ inch groove, and which will, after being held under the precompressing pressure for a relatively short time, say 30 seconds at 100 p.s.i., remain at the desired precompressed thickness for a length of time adequate to insert it in the groove. This length of time may be say 5 or 6 minutes. In order to accomplish the desired function of keeping out liquids such as water, the material is chosen to be one which, when it has expanded to its full confined pressure in the joint space, then has a texture which is sufficiently compact to be essentially impervious to water, and which presses sufficiently against the walls forming the joint space (the aforementioned 1½ p.s.i., built into the material for a previously mentioned reason, being quite sufficient) to provide a water-tight seal at the contiguous surfaces so that water cannot seep in between the material and the walls of the joint space. In order to reject granular particles the material is chosen to be one which, when in place, confined under pressure in a joint, has a non-tacky exposed surface and a resilient texture so that granular particles do not stick to the surface but rather bounce off it.

A sample product which might be under consideration for use with this invention would, as previously indicated, comprise a cellular elastomer, having open interconnecting cells, which has been impregnated with a pressure-sensitive adhesive to coat the cell walls so that after the product has been tightly compressed to highly reduce its thickness it will remain at the highly reduced thickness, for example, about $\frac{1}{16}$ of its unconfined thickness, long enough to facilitate its insertion in a joint space considerably narrower than its unconfined thickness.

The sealer of the present invention, shown in one preferred embodiment at 2 in FIGS. 1 and 2, comprises a strip of elastomer foam impregnated with a pressure-sensitive adhesive capable of retaining the strip for an appreciable length of time in a compressed condition wherein its thickness is substantially less than its uncompressed thickness. In FIG. 1 the strip is shown in position in the groove 4 of a contraction joint comprising two sections, 6 and 8, of a concrete slab, which slab has cracked as shown at 10 along its weakened plane. The strip is shown in FIG. 2 in its expanded, unconfined, unstretched condition showing that its thickness is substantially greater in its unconfined condition than when it is located in the joint. The material of the impregnated strip is of such elasticity that it will return, after release from confinement under pressure, to substantially its unconfined configuration.

The joint filler strip of the invention can be made of any of a number of expanded cellular elastomers as long as they have open interconnecting cells to permit of the absorption of pressure-sensitive adhesive. Typical foam or sponge rubbers or elastomers which may be used are Hevea rubber, GR–S rubber, butyl, neoprene, nitrile rubber, polysulfide rubber, silicone rubber, fluorocarbon rubber, and polyacrylate rubber. However, a particular material which has been found to be particularly suited for use in this invention because of easy availability, economy, and resistance to undesirable chemical and physical changes under the conditions of use, is the material known variously as sponge polyurethane or flexible urethane foam, the latter being defined by the American Society for Testing Materials as "an expanded cellular product produced by the interaction of polyhydroxy compounds, water and isocyanates." Polyurethane foam comes in various types all of which consist usually of a network of cells of uniform character which are essentially open and interconnecting.

An inexpensive and quite satisfactory pressure-sensitive adhesive for use with flexible urethane foam is asphalt such as the type used in the emulsion designated SS–2 in Federal Specification SS–A–674b dated November 25, 1952 for Asphalt, Paving, Emulsion. This is the same emulsion as that designated as SS–1h in the Asphalt Handbook, Revised Edition, Manual Series No. 4, Second Printing September 1960, published by The Asphalt Institute, College Park, Maryland. This asphalt is designated in the Federal Specification as having a penetration range of 40–90 which corresponds in the Asphalt Handbook to a weight of 8.5 to 8.6 pounds per gallon. This asphalt can be conveniently applied in the emulsion form. The adhesive must be of sufficient strength to retain the foam temporarily in its compressed condition but not so much that it will prevent the foam from expanding. A suitable impregnant can be made by mixing three parts of this asphalt emulsion with two parts of water by volume. The strips of elastomer are immersed in this mixture and while so immersed they are squeezed and released by means of rolls, presses, or other suitable devices to insure that the cells are filled with the emulsified asphalt. Thereafter the saturated strips are subjected to a second pass through rolls or presses to remove the excess liquid and are dried, conveniently by hanging them up in the air to dry, either in the sun or in artificially-heated drying chambers. When using polyurethane foam of the aforementioned category selected to be of a density from 2 to 2.2 pounds per cubic foot it has been found that an excellent product results by adjusting the second pass to remove sufficient excess of adhesive so that after drying to remove the aqueous (continuous) phase of the emulsion there remains about 1 quart of asphalt per cubic foot of polyurethane foam at 77° F.

One method contemplated by this invention for using the product just described is to compress the impregnated strip at the job site by means of rolls, presses, or clamps, sufficiently to permit easy insertion of the strip into the groove to be sealed and then simply inserting it in the groove. In the typical example, chosen for illustration only, the polyurethane strip 1 inch thick would be compressed, for insertion into a groove ⅛ inch wide, to a thickness of about $\frac{1}{16}$ of an inch. This can easily be done by a portable hydraulic press applying a pressure to the strip of the order of about 50 lbs. per square inch. The delayed rebound imparted to the joint filler strip by the pressure-sensitive adhesive permits of sufficient time for insertion of the contracted strip into the groove to be sealed. As previously noted, if the strip is held under a pressure of 50 lbs. per square inch in its contracted state for about one minute, or 100 lbs. per square inch for about 30 seconds it will then take about 5 or 6 minutes before regaining its original thickness if allowed to expand without confinement at about 77° F. After insertion in the groove the resilience or elasticity of the cellular elastomer overcomes the restriction of the adhesive material and the elastomer expands so as to exert a pressure of at least about 1½ p.s.i. against the sides of the groove and thus resist dislodgement and create a satisfactory seal.

In order to obtain the essential properties of the impregnated elastomer hereinbefore described it is required that the quantity of pressure-sensitive adhesive be enough to provide the adhesion adequate to temporarily restrain the impregnated product against expansion after it has been tightly compressed (to facilitate insertion of the product in a joint space) but not so much as to result in a product which is either undesirably tacky from exuded adhesive or which is incapable of being compressed to the extent needed for the easy insertion into a narrow joint space of a piece thick enough in its uncompressed configuration to yield the desired pressure upon expansion against the walls of the joint space. While the ultimate test of whether or not a particular product falls within the scope of the invention is a determination of whether or not it has the hereinbefore-recited characteristics of compressibility for insertion in a narrow joint space, specified minimum rebound pressure against the joint space walls etc., nevertheless as a useful guide to the manufacture of products for use with the invention consideration can be taken of the maximum amount of adhesive which has been found to be satisfactory when used with particular cellular elastomers. It has been found that to obtain a suitable product according to the invention the amount of adhesive used to impregnate a particular cellular elastomer should not exceed an amount equal to essentially about 90% of the volume of voids contained in the compressed, unimpregnated cellular elastomer when it has been compressed to the extent required for easy insertion in a joint space. By way of illustration with one sample of polyurethane foam impregnated with adhesive equal to 96.3% of the aforementioned volume of voids it was found to be incapable of being compressed sufficiently to insert easily in a ⅛ inch wide groove when used in a strip originally wide enough in its uncompressed state to produce the required rebound pressure against the walls of a ⅛ inch wide groove. Typically it has been found quite suitable to use an amount of adhesive equal to about 85% of the aforementioned voids rather than approaching very close to allowable maximum of 90%. By respecting this upper limit there is avoided the undesired exuding of adhesive which would be caused by overfilling the voids in the elastomer and there is achieved assurance that the impregnated elastomer will be sufficiently compressible to facilitate easy insertion in the joint space for which it is intended.

No conclusive theory is proposed for the explanation of the 90% upper limit but a clue to the basis for it may lie in the realization that in the foams marketed as open-cell cellular elastomer a certain percentage of the cells are actually closed and thus could not absorb adhesive unless they were ruptured subsequent to manufacture.

An excess of asphalt beyond that allowed by these limits means that the absolute quantity of asphalt then typically becomes so much that it not only becomes tacky when compressed and thus undesirably retains granular particles but prevents compression under the practically permissible pressure of about 100 p.s.i. to the desired 1/16 inch needed for easy insertion of a piece of material thick enough to exhibit pressure against the walls of the confining groove or joint of at least 1½ p.s.i. after reaching maximum expansion pressure while so confined. This phenomenon can be understood when it is realized that once the material is under sufficient pressure to bring the adhesive-coated cell walls into contact with one another, the presence of even slightly excessive amounts of adhesive makes necessary prohibitively high pressures to produce ever so small a further percentage reduction of thickness since under this condition the elastomer and adhesive constitute effectively a solid body and such a solid body is essentially incompressible.

The finished product achieved by the use of the joint sealer strip of this invention is the sealed joint of this invention which exhibits several desirable characteristics. The joint space or groove may be as narrow as about ⅛ inch, a width into which it is impractical to apply liquid joint sealers. There is no excess material spilled on the pavement surfaces in the joint of this invention resulting in smooth surfaces free from sticky material. There is no requirement for sandblasting grooves to remove curing compounds from the sealed joint of this invention such as is required for poured sealers. The joints of the present invention are of more uniformly high caliber because all manufacture is done under factory control instead of being done under unfavorable field conditions by labor crews. The surface of the sealer in the sealed joint is not tacky during warm weather as is the case with liquid applied sealing compounds which retain and imbed gravels and other non-compressibles. The joint always remains tightly sealed even under circumstances of contraction of the concrete by very low temperatures since the unconfined, unstretched thickness of the joint filler strips is several times greater than the width of the groove under all conditions of usage. As can be undersaood from the example chosen for illustration here the unconfined thickness of the joint filler strip is about eight times the normal width of a groove cut at say eight hours after pouring of the concrete.

Another embodiment of the joint filler strip of this invention is shown in FIG. 3 wherein the cellular elastomer strip 12 is provided with a leader strip 14 to facilitate inserting it into the joint space to be sealed.

FIG. 4 shows the joint filler strip of FIG. 3 in the process of being applied to seal a contraction joint according to another method of the invention. According to this method of the invention the cellular elastomer strip is precompressed to facilitate insertion in the joint space not, as in the preceding method by compressing at some period of time prior to insertion and retaining it in its contracted state by pressure-sensitive adhesive, but by the very act of insertion in the groove or joint space to be sealed. Thus, the joint sealer strip of FIGS. 3 and 4 need not be impregnated with pressure-sensitive adhesive and therefore may be in the form of a closed cell elastomer sponge as well as in an open cell form. Furthermore, it is also possible to use for this strip solid, flexible elastomer as distinguished from cellular elastomer since some such solid elastomers can by the act of stretching them be reduced in thickness sufficiently for insertion in a joint space. If desired, the sealer strip of FIGS. 3 and 4 may, of course, be used with a coating or impregnation of a material such as the aforementioned asphalt. The leader strip 14 is conveniently made of metal, typically a 32 gauge steel, which has sufficient strength to withstand the force of a tool applied to it to force it into the the joint space while it pulls the elastomer strip which is thus compressed into the relatively narrow width of the groove. Non-metallic leader strips of fiber, plastic or the like can also be used. The leader strip can be of any configuration which will give purchase to the inserting tool and which will act to resist egression of the joint filler strip from the joint groove as the inserting tool is withdrawn. One convenient series of shapes for the leader strip is thus seen to be the group which provides a concavity facing the elastomer strip, and hence facing the opening of the joint space when in use, so that once inserted in the joint the leader strip tends to expand from its own resilience and resists removal, in the manner of the head of an arrow or the barbs of a fishhook. In the useful embodiment shown in FIGS. 3 and 4 the leader strip 14 is V-shaped and has only one side wall 16 affixed to the elastomer strip 12. By way of example only, the attachment together only of strip 12 with leader strip 14 is shown in FIG. 3 as accomplished by staples 17. The attachment can be accomplished by any suitable method which will firmly hold the strip 12 to the leader strip 14 such as cementing, stapling, or fastening with prongs punched out of the wall 16 itself and bent over in the manner of a staple. The elastomer strip is most commonly available in pieces having a uniform rectangular cross section. When such an elastomer strip if affixed to the leader strip 14 it assumes the shape shown in FIG. 3 wherein a portion 18 of the normally rectangular elastomer strip is compressed into a V-shaped projection fitting into the leader strip 14. Although a rectangular cross section elastomer strip is most readily available, it is, however, also possible to use elastomer strip cut or extruded to provide a projection similar to 18 suitable for attachment to the leader strip without appreciable compression.

In carrying out one method of the invention for sealing the joint with the joint filler strip of FIG. 3 a tool 20 of any suitable design carrying a blade 22 of a thin strip of metal or having a series of pins and a suitable handle or other support, is placed with its blade or pins bearing against the leader strip where it provides adequate purchase such as against the bottom of the concavity in the leader strip between the leader strip and that side wall of the concavity of the leader strip which is not affixed to the elastomer. A typical tool which can be used for this purpose is a putty knife or the like. The insertion of the tool causes the elastomer to assume the solid line shape shown in FIG. 4, whereas when the tool is absent the elastomer assumes the shape filled out by the phantom line. With the tool in position, pressure on it forces the leader strip into the joint groove. During the insertion of the strip, the strip pulls with it the elastomer, thus compressing it to a thickness considerably less than its unconfined thickness. The tool is withdrawn leaving the joint filler strip to be held in the groove by virtue of the expansion of the leader strip and of the elastomer strip to press against the walls of the joint groove. The finished sealed joint is essentially the same as the joint shown in FIG. 1, with the exception that the leader strip 14 remains in the groove. This in no way affects the effectiveness of the joint.

Still another embodiment of the invention is shown in FIG. 5 which illustrates a joint filler strip especially adapted for use with another of the methods of the invention for making a sealed joint in concrete or the like. This filler strip comprises a strip of cellular elastomer 24 provided with a leader strip 26 similar to the leader strips of FIGS. 3 and 4, and also provided with a cover 28 cooperating with the leader strip to retain the elastomer in its contracted configuration, as shown in solid lines, wherein its thickness is a small fraction of its unconfined thickness as illustrated in phantom lines. The cover can conveniently be formed of a single sheet of sheet metal or the like, bent into a generally U-shaped configuration but preferably provided with some means for readily grasping the cover at its closed end such as the enlargement 30 providing projections 32.

The embodiment of FIG. 5 can be used to seal a joint for a sawed groove such as in FIG. 1 or a preformed or dummy groove produced in a fashion known in the prior art. However, this embodiment is particularly useful in carrying out a method of the invention wherein the embodiment itself is used to form a groove. According to this method the concrete is first poured in the usual manner and while it is still soft the joint filler strip of FIG. 5 is vibrated with its leader strip down into the concrete until the top of the restraining cover is substantially flush with the pavement surface. Preferably a bond breaker such as form oil or concrete curing compound is applied to the sides of the cover 28 before it is driven into the concrete. After the concrete sets, the leader strip is held by the concrete and the cover 28 is then lifted out, gripping it being facilitated by the presence of the projecting edges 32. This leaves the expanded elastomer strip in the groove which was formed in the concrete.

As previously mentioned the joint filler strips of the present invention can be used to seal various other joints in addition to contraction joints in concrete pavements. They can be used to seal joints in vertical walls and as a caulking material to fill spaces in building construction or for other uses requiring a caulking compound. The use of the invention in such other joints for the most part is obvious. For example, when the filler strip of this invention is used in what is properly known as a construction joint, as described in the aforementioned publication of the Portland Cement Association, the product and methods of its use are substantially identical with the products and methods used in sealing contraction joints. In the case of expansion joints as described in the aforementioned Portland Cement Association publication where dowel bars or the like are used spanning the joint space then the elastomer strip of the invention must be pierced by the dowel bars. When the filler strip illustrated in FIG. 5 is used in such an expansion joint the elastomer strip 24 is punctured with a hole through which the dowel bar passes, but the cover 28 must have a slot cut from its open end up to and including the region surrounding the dowel bar so that the cover 28 can be removed after concrete poured around it has set.

In FIG. 6 is shown one preferred embodiment of the joint filler strip of this invention prepared for storage, shipment, and use without the requirement for precompression at the job site. This embodiment comprises a cellular elastomer strip 34 impregnated with pressure-sensitive adhesive in the manner of the strip of FIG. 2 and retaining elements 36 on opposite sides of the elastomer strip coacting to retain the elastomer strip in its contracted condition to which it has been precompressed to a convenient thickness to be inserted in a joint space. The assembly is held together by means of staples 38 or the like. The retaining elements 36 can be made of fiber, "Masonite," or any suitable material which is strong enough to serve the purpose. The elastomer strip is readily removable from the retaining elements. To remove it, it suffices to remove the staples. One way of doing this is simply to tear the elements 36 away from each other, thus pulling out the staples. In the case of the aforedescribed preferred polyurethane elastomer strip it has been found that if the elastomer has remained in its compresed condition for several days it will take 20 to 30 minutes for it regain its unconfined width when released from compression. This indicates that there is plenty of time after removal of retaining elements 36 to insert the strip 34 in the joint space of a joint to be sealed. Other types of retaining elements can be used in place of the sandwich form shown in FIG. 6. For example, a tight wrapper or a strong envelope could be used, in which cases the elastomer can be removed by simply cutting the envelope or wrapper.

From the foregoing it is apparent that the present invention provides joint sealers and methods of sealing joints, and methods of making sealed joints which are far superior to those of the prior art. This invention permits installation of the sealing material at any desired distance below the surface of the pavement. As a practical matter it is impossible to stop the liquid sealers of the prior art at a predetermined distance from the surface of the pavements. It is desirable, especially for concrete pavements used by jet aircraft to keep sealing material about ¼ inch down from the surface to reduce the possibility of blow-outs. This invention facilitates the easy sealing of grooves in concrete ⅛ inch wide and narrower. No other materials yet developed permit of a practical method of filling these very narrow grooves. Cold-applied sealers are too viscous. Hot-applied sealers chill and stop flowing too close to the surface of the concrete. This invention facilitates the installation of elastic sealing material in vertical grooves such as in cocnrete walls.

Obviously many modifications and variations of the present invention are possible in the light of the above teachings. It is therefore to be understood that within the scope of the appended claims, the invention may be practiced otherwise than as specifically described herein.

What is claimed is:

1. A joint filler strip comprising a strip of cellular elastomer, a leader strip affixed to said strip of elastomer to lead said strip of elastomer into a joint space, and a removable cover for said elastomer strip; said leader strip and said cover retaining said elastomer strip contracted to a thickness considerably less than its unconfined thickness; said cover and said leader strip being of sufficient strength and rigidity and coacting together to form a complete enclosure for said elastomer strip so that the filler strip is capable of being driven into soft concrete to form a groove therein.

2. The joint filler strip of claim 1 wherein said leader strip is concave toward said strip of elastomer, is of sufficient resilience, and is so shaped and dimensioned relative to said joint space, all so that said leader strip engages the sides of said joint space to resist removal from said joint space of said leader strip and the elastomer strip affixed thereto when said cover is removed from said filler strip.

3. The method of making a sealed joint in concrete which comprises driving into soft concrete the joint filler strip of claim 1; allowing said concrete to set; and thereafter removing the cover of said joint filler strip.

4. A joint filler strip comprising a strip of elastomer, at least the major portion of which in its unconfined, unstretched state is of a thickness substantially greater than the greatest width assumed under conditions of usage by the joint space in which the filler is to be used and which is capable of being readily reduced in thickness to a thickness sufficiently less than the width of said joint space to facilitate insertion of said filler strip in said joint space;

a leader strip affixed to said elastomer strip to lead said filler strip into said joint space;

means on said leader strip to provide purchase for the surface of a tool to be used to push against said leader strip to force said filler strip into said joint space;

said leader strip being made of material of sufficient tensile strength to withstand the force required to draw said elastomer strip into said joint space;

said leader strip being contiguous to not more than a relatively minor portion of said strip of elastomer;

the major portion of said strip of elastomer being bare and unsheathed, whereby when said leader strip is caused to lead said filler strip into said joint space it pulls said strip of elastomer into said joint space, and whereby the major portion of said strip of elastomer is left free for direct contact with the walls of said joint space to seal said joint space regardless of irregularities in said walls;

said last mentioned major portion of said strip of elastomer being in its unconfined, unstretched state of a thickness considerably greater than the width of said joint filler strip as measured at every location along the depth of said leader strip when said joint filler strip is within said joint space;

and means at spaced intervals along essentially the entire contiguous lengths of said strip of elastomer and said leader strip for affixing said strips of elastomer and leader together locally at places distributed along essentially the entire lengths of said strips so as essentially to prevent bodily displacement of said strips relative to each other at the contacting interface of said strips.

5. The joint filler strip of claim 4 wherein said leader strip is concave toward said strip of elastomer, is of sufficient resilience, and is so shaped and dimensioned relative to said joint space, all so that said leader strip engages the sides of said joint space to resist removal from said joint space of said leader strip and the said filler strip.

References Cited by the Examiner
UNITED STATES PATENTS

| | | | |
|---|---|---|---|
| 1,697,563 | 1/1929 | Heltzel | 94—18 |
| 1,885,391 | 11/1932 | Thompson | 94—18 |
| 1,960,374 | 5/1934 | Edmonds | 94—18 |
| 1,979,141 | 10/1934 | Clark | 277—231 |
| 2,045,256 | 6/1936 | Voigt. | |
| 2,066,270 | 12/1936 | Hubbard | 277—231 |
| 2,068,035 | 1/1937 | Meyer. | |
| 2,139,465 | 12/1938 | Robertson | 94—18 |
| 2,149,291 | 3/1939 | Hofwolt | 94—18 |
| 2,240,787 | 5/1941 | Kinzer | 94—18 |
| 2,315,588 | 4/1943 | Brickman | 94—18 |
| 2,401,936 | 6/1946 | Jenkins | 94—18 |
| 2,771,165 | 11/1956 | Bell | 20—69 |
| 2,964,424 | 12/1960 | Mast. | |
| 2,967,467 | 1/1961 | Maude | 94—18 |
| 3,038,395 | 6/1962 | Middlestadt | 94—18 |
| 3,052,945 | 9/1962 | Cummings | 94—18 |

JACOB L. NACKENOFF, *Primary Examiner.*